Jan. 11, 1944.　　　W. K. BONAS　　　2,338,754
WIRE BUNDLE CLAMP
Filed Dec. 1, 1942

*INVENTOR.*
WILLIAM K. BONAS
BY George Douglas Jones
ATTORNEY

Patented Jan. 11, 1944

2,338,754

UNITED STATES PATENT OFFICE 2,338,754

WIRE BUNDLE CLAMP

William K. Bonas, Parkville, Md., assignor to The Glenn L. Martin Company, Middle River, Md., a corporation of Maryland Application December 1, 1942, Serial No. 467,533

2 Claims. (Cl. 248—74)

This invention relates to a clamping device. In the preferred embodiment of the invention, the clamping device is shown on a wire bundle clamp.

In electrical installations, of either permanent or temporary character, wires are strung along walls or any supporting structure. At necessary intervals, the electric wires are caught up in a bundle and secured to a supporting structure. It is often necessary to remove the clamp to add new wires to the bundle or remove wires from the bundle. For this reason, a clamp having an easily operable clamping device, is desirable.

The clamping device of this invention provides a simple yet reliable expedient for securing any two members together in a manner in which they may be quickly and easily detached.

By using this invention, a clamp is provided that affords quick accessibility to the wire bundle without the use of tools, yet holds the wires clamped in a bundle, secure against accidental displacement.

Further and other objects will become apparent from the description of the accompanying drawing which forms a part of this disclosure and in which like numerals refer to like parts.

Figure 1:
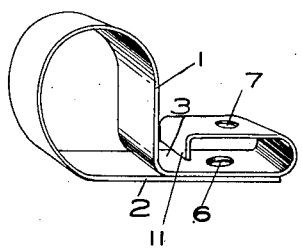
Figure 1 shows a perspective view of the wire bundle clamp, embodying the invention.
Figure 2:
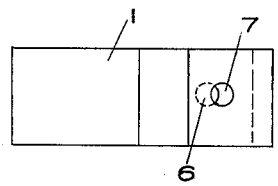
Figure 2 shows a plan view of the same.
Figure 3:
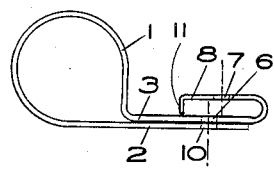
Figure 3 shows a side view of the clamp.
Figure 4:
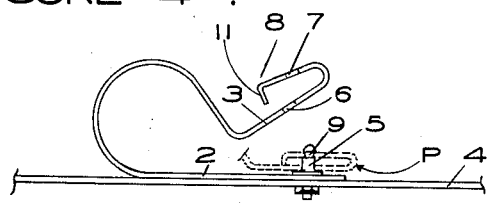
Figure 4 shows the clamp in an operative position on a mounting stud.

The clamp shown in the drawing is formed of a strip of metal 1 which may be either steel or aluminum alloy. Portions 2 and 3 of the clamp have holes which are in substantial alignment. Hole 10 in portion 2 permits the mounting of that portion of the clamp securely on a structural member 4, by any means such as stud 5. Hole 6, in clamp portion 3, slides over the stud due to its alignment with hole 10 in portion 2. Hole 7 in clamp portion 8 is axially misaligned with hole 6, as shown in Figures 2 and 3. It can readily be seen from Figure 4, that hole 6 will slide over the stud while the edge of hole 7 will tightly engage the stud, when forced over the stud, and comes to rest in a groove 9 of the stud. Only slight pressure is required on portion 8 to force hole 7 over the stud and the resiliency of the metal causes the necessary clamping action of portion 8 in groove 9. To release the clamp it is merely necessary to exert slight pressure at the point indicated as "P." This pressure relieves the tension that holds the edge of hole 7 in groove 9, and portion 8 springs out of engagement with the stud. Portion 3 readily slides over the stud. The critical feature of this device is the calculated misalignment of center lines of holes 6 and 7.

Portion 11 acts as a spacer to prevent the load on the clamping device from forcing portion 3 into contact with portion 8, which might act to spring the edge of hole 7 out of the groove in the stud.

The above described application of the securing device to a wire bundle clamp is intended to show the utility of the device. It should be understood that the securing device is capable of many applications.

Figure 5:
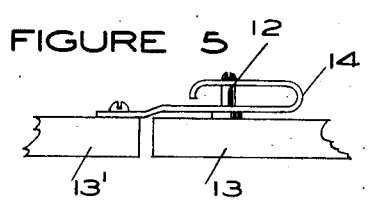
Figure 5 illustrates another application of the clamping device.

Figure 5 illustrates another typical use where it is desired to secure two members together. The post or stud 12 would be mounted on member 13 and the securing device 14 on 13'.

The action of the device is similar to that described above.

Figure 6:
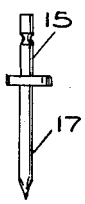
Figures 6 and 7 illustrate the post with a nail and wood screw adaptation.
Figure 7:
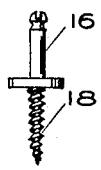

Figures 6 and 7 show posts 15 and 16 with nail and screw adaptations 17 and 18 for securing the same to wooden structures.

It is to be understood that certain changes, alterations, modifications, and substitutions can be made without departing from the spirit and scope of the appended claims.

I claim as my invention:

1. A clamping device comprising a strip of resilient material having a looped supporting portion secured at one end to a supporting surface by a stud having a neck portion and a head portion, the other end of said strip being bent to form a U-shaped portion, said formed end of said strip having the end thereof bent to form spacing means to prevent contact between the sides of said U-shaped portion, said sides of said U-shaped portion having holes formed therein for mounting over said stud, said holes being misaligned to cause a clamping action on the stud by the edges of said holes.

2. In combination, a mounting stud having a head portion and a neck portion, a clamp having one end adapted to be mounted on said stud and secured to a support, said clamp having a second end bent in substantially U-shaped form, spacing means secured to one side of the U-shaped member at the end of said clamp to prevent contact between the sides thereof, holes in each portion of said U-shaped member whereby said member is mounted on said stud, said holes being misaligned to cause a clamping action on said stud by the edges of said holes.

WILLIAM K. BONAS.